United States Patent
Sato et al.

(10) Patent No.: US 10,520,084 B2
(45) Date of Patent: Dec. 31, 2019

(54) METAL BELLOWS

(71) Applicant: EAGLE INDUSTRY CO., LTD., Minato-ku, Tokyo (JP)

(72) Inventors: Koji Sato, Tokyo (JP); Kuniaki Miyake, Tokyo (JP); Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 19 days.

(21) Appl. No.: 15/758,693

(22) PCT Filed: Sep. 14, 2016

(86) PCT No.: PCT/JP2016/077047
§ 371 (c)(1),
(2) Date: Mar. 8, 2018

(87) PCT Pub. No.: WO2017/051753
PCT Pub. Date: Mar. 30, 2017

(65) Prior Publication Data
US 2018/0259068 A1  Sep. 13, 2018

(30) Foreign Application Priority Data

Sep. 23, 2015  (JP) .................................. 2015-186171

(51) Int. Cl.
*F16J 3/04*     (2006.01)
*F16J 15/36*    (2006.01)
*F15B 1/10*     (2006.01)

(52) U.S. Cl.
CPC ............... *F16J 3/047* (2013.01); *F15B 1/103* (2013.01); *F16J 15/366* (2013.01)

(58) Field of Classification Search
CPC ... F16J 3/04; F16J 3/047; F16J 15/366; F15B 1/103; F15B 2211/8616
See application file for complete search history.

(56) References Cited

U.S. PATENT DOCUMENTS 1,731,130 A * 10/1929 Fulton ...................... F16J 3/047
                                                                92/34
2,942,838 A *  6/1960 Peters ...................... F16J 3/047
                                                                92/41
(Continued)

FOREIGN PATENT DOCUMENTS

JP     H02195001 A     8/1990
JP       2539905 B2    10/1996
(Continued)

OTHER PUBLICATIONS

International Search Report (ISR) dated Oct. 11, 2016, issued for International application No. PCT/JP2016/077047.

*Primary Examiner* — Michael Leslie
(74) *Attorney, Agent, or Firm* — Law Office of Katsuhiro Arai

(57) ABSTRACT

A metal bellows of great durability capable of preventing breakage at both end portions of the metal bellows is provided. The metal bellows is annular-shaped and has, axially repeatedly, a structure in which, from an axial end portion 10c, a belly, a valley, a belly, a peak, and a belly are integrally formed in series sequentially in this order. The end portion 10c has a first connection belly 10d connected to a fitting member 15, and a connection valley 10e and a second connection belly 10f extending sequentially from the first connection belly 10d axially inward. The axial width b1 of the connection valley 10e in a free state is set larger than the axial width of valleys 10i, 10m, . . . or peaks 10g, 10k, . . . in a portion other than the end portion 10c.

3 Claims, 5 Drawing Sheets

(56) References Cited

U.S. PATENT DOCUMENTS

| | | | | |
|---|---|---|---|---|
| 3,469,502 A | * | 9/1969 | Gardner | F16J 3/047 92/34 |
| 5,011,166 A | * | 4/1991 | Watts | F16J 3/047 277/379 |
| 5,261,319 A | * | 11/1993 | Laville | F16J 3/047 92/47 |
| 9,683,583 B2 | * | 6/2017 | Arikawa | F16J 3/047 |
| 2017/0307083 A1 | * | 10/2017 | Sato | F16J 3/047 |
| 2018/0087665 A1 | * | 3/2018 | Endo | F16J 3/047 |

FOREIGN PATENT DOCUMENTS

| | | | |
|---|---|---|---|
| JP | 2005048902 A | | 2/2005 |
| JP | 2005140285 A | | 6/2005 |
| JP | 2005155835 A | | 6/2005 |
| JP | 2006300090 A | | 11/2006 |
| JP | 2009008184 A | | 1/2009 |
| JP | 2015137646 A | | 7/2015 |

\* cited by examiner

METAL BELLOWS

This application is the U.S. National Phase under 35 U.S.C. § 371 of International Application PCT/JP2016/ 077047, filed Sep. 14, 2016, which claims priority to Japanese Patent Application No. 2015-186171, filed Sep. 23, 2015. The International Application was published under PCT Article 21(2) in a language other than English.

TECHNICAL FIELD

The present invention relates to a metal bellows. More particularly, a metal bellows of the present invention relates to a formed bellows suitably suitable for a component of an accumulator for vehicle use or the like.

BACKGROUND ART

In conventional metal bellows, for example, formed metal bellows, U-shaped bellows with peaks and valleys shaped like a letter U are known (See Patent Documents 1 and 2, for example. Hereinafter they are referred to as "Conventional Art 1.").

Also known are metal bellows characterized in that an accordion-like tube wall has peaks of a U-shaped cross-sectional shape protruding outward of the tube, and valleys of a V-shaped cross-sectional shape protruding inward of the tube (See Patent Document 3, for example. Hereinafter, they are referred to as "Conventional Art 2.").

CITATION LIST

Patent Documents

Patent Document 1: JP 2539905 B1
Patent Document 2: JP 2005-48902 A
Patent Document 3: JP 2009-8184 A

SUMMARY OF THE INVENTION

Problem to be Solved by the Invention

However, Conventional Art 1 and Conventional Art 2 described above have a problem that a pitch representing a dimension from a peak to a peak or from a valley to a valley of a metal bellows is constant over the entire length, and thus when both end portions thereof are fixed to collar members by welding or the like for use in a device such as an accumulator, great stress acts particularly on the both end portions connected to the collar members, breaking the both end portions.

When a metal bellows is used in a device such as an accumulator, a vibration damping ring is fitted to one free-side end portion thereof. When the pitch is constant over the entire length as in Conventional Art 1 and Conventional Art 2, the width of a valley portion in which the vibration damping ring is pinched is also constant in conjunction with the pitch. Thus, there is a problem that the axial width of the vibration dampening ring is limited within the width of the valley portion, or when a gap between the vibration dampening ring and bellies on both sides of the valley portion is small, the vibration dampening ring abuts the bellies, breaking the bellies.

It is a first object of the present invention to provide a metal bellows of great durability capable of preventing breakage at both end portions of the metal bellows.

It is a second object of the present invention to provide a metal bellows capable of providing spaces for members including a vibration damping ring when they are fitted to the both end portions of the metal bellows, and preventing breakage of the both end portions.

Means for Solving Problem

To attain the above object, a metal bellows according to a first aspect of the present invention is a metal bellows in an annular shape, including, axially repeatedly, a structure in which, from an axial end portion, a belly, a valley, a belly, a peak, and a belly are integrally formed in series sequentially in this order, in which the end portion has a first connection belly connected to a fitting member, and a connection valley and a second connection belly extending sequentially from the first connection belly axially inward, and the connection valley in a free state has an axial width set larger than an axial width of valleys or peaks in a portion other than the end portion.

According to this aspect, the amount of deformation of the connection valley at the end portion of the metal bellows, and hence, the amount of deformation of the end portion can be reduced, bending stress occurring at the end portion can be reduced, and stress-caused breakage of the end portion where stress is relatively concentrated can be prevented. Thus the life of the metal bellows can be extended.

Further, a lateral space for fitting a vibration damping ring to the connection valley at the end portion of the metal bellows can be provided, which allows secure mounting of the vibration damping ring, and prevents the first connection belly and the second connection belly from striking a mounting portion of the vibration damping ring even when the metal bellows contracts. Thus breakage of the first connection belly and the second connection belly can be prevented, and the life of the metal bellows can be extended.

A metal bellows according to a second aspect of the present invention is a metal bellows in an annular shape, including, axially repeatedly, a structure in which, from an axial end portion, a belly, a peak, a belly, a valley, and a belly are integrally formed in series in this order, in which the end portion has a first connection belly connected to a fitting member, and a connection peak and a second connection belly extending sequentially from the first connection belly axially inward, and the connection peak in a free state has an axial width set larger than an axial width of peaks or valleys in a portion other than the end portion.

According to this aspect, the amount of deformation of the connection valley at the end portion of the metal bellows, and hence, the amount of deformation of the end portion can be reduced, bending stress occurring at the end portion can be reduced, and stress-caused breakage of the end portion where stress is relatively concentrated can be prevented. Thus the life of the metal bellows can be extended.

According to a third aspect of the present invention, in the metal bellows in the first or second aspect, the connection valley or the connection peak includes a linear portion parallel to an axial direction.

According to this aspect, the axial width of the connection valley or the connection peak in the free state can be easily increased.

According to a fourth aspect of the present invention, in the metal bellows in the first or second aspect, the connection valley or the connection peak is formed by an arc portion with a curvature radius larger than a curvature radius of valleys or peaks in a portion other than the end portion.

According to this aspect, the connection valley or the connection peak can be entirely formed by a smooth curve when the axial width of the connection valley or the connection peak in the free state is increased, and stress concentration at the connection valley or the connection peak can be prevented.

According to a fifth aspect of the present invention, in the metal bellows in the first aspect, a vibration damping ring for guiding axial movement of the metal bellows in a shell during extension and contraction operations is provided in the connection valley at an end portion on a freely moving end side of the metal bellows.

According to this aspect, the vibration damping ring is mounted securely, so that the vibration damping ring can sufficiently exert a guiding function.

Effects of the Invention

The present invention achieves the following outstanding effects.
(1) The axial end portion of the metal bellows has the first connection belly connected to the fitting member, and the connection valley and the second connection belly extending sequentially from the first connection belly axially inward, and the connection valley in the free state has the axial width set larger than the axial width of the valleys or the peaks in the portion other than the end portion, so that the amount of deformation of the connection valley at the end portion of the metal bellows, and hence, the amount of deformation of the end portion can be reduced, bending stress occurring at the end portion can be reduced, and stress-caused breakage of the end portion where stress is relatively concentrated can be prevented. Thus the life of the metal bellows can be extended.

Further, the lateral space for fitting the vibration damping ring to the connection valley at the end portion of the metal bellows can be provided, which allows secure mounting of the vibration damping ring, and prevents the first connection belly and the second connection belly from striking the mounting portion of the vibration damping ring even when the metal bellows contracts. Thus breakage of the first connection belly and the second connection belly can be prevented, and the life of the metal bellows can be extended.
(2) The axial end portion of the metal bellows has the first connection belly connected to the fitting member, and the connection peak and the second connection belly extending sequentially from the first connection belly axially inward, and the connection peak in the free state has the axial width set larger than the axial width of the peaks or the valleys in the portion other than the end portion, so that the amount of deformation of the connection valley at the end portion of the metal bellows, and hence, the amount of deformation of the end portion can be reduced, bending stress occurring at the end portion can be reduced, and stress-caused breakage of the end portion where stress is relatively concentrated can be prevented. Thus the life of the metal bellows can be extended.
(3) The connection valley or the connection peak includes the linear portion parallel to the axial direction, so that the axial width of the connection peak in the free state can be easily increased.
(4) The connection valley or the connection peak is formed by the arc portion with the curvature radius larger than the curvature radius of the valleys or the peaks in the portion other than the end portion, so that the connection valley or the connection peak can be entirely formed by a smooth curve when the axial width of the connection valley or the connection peak in the free state is increased, and stress concentration at the connection valley or the connection peak can be prevented.
(5) The vibration damping ring for guiding axial movement of the metal bellows in the shell during extension and contraction operations is provided in the connection valley at the end portion on the freely moving end side of the metal bellows, so that the vibration damping ring is mounted securely. Thus the vibration damping ring can sufficiently exert a guiding function.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise explicitly described.

First Embodiment

Figure 1:
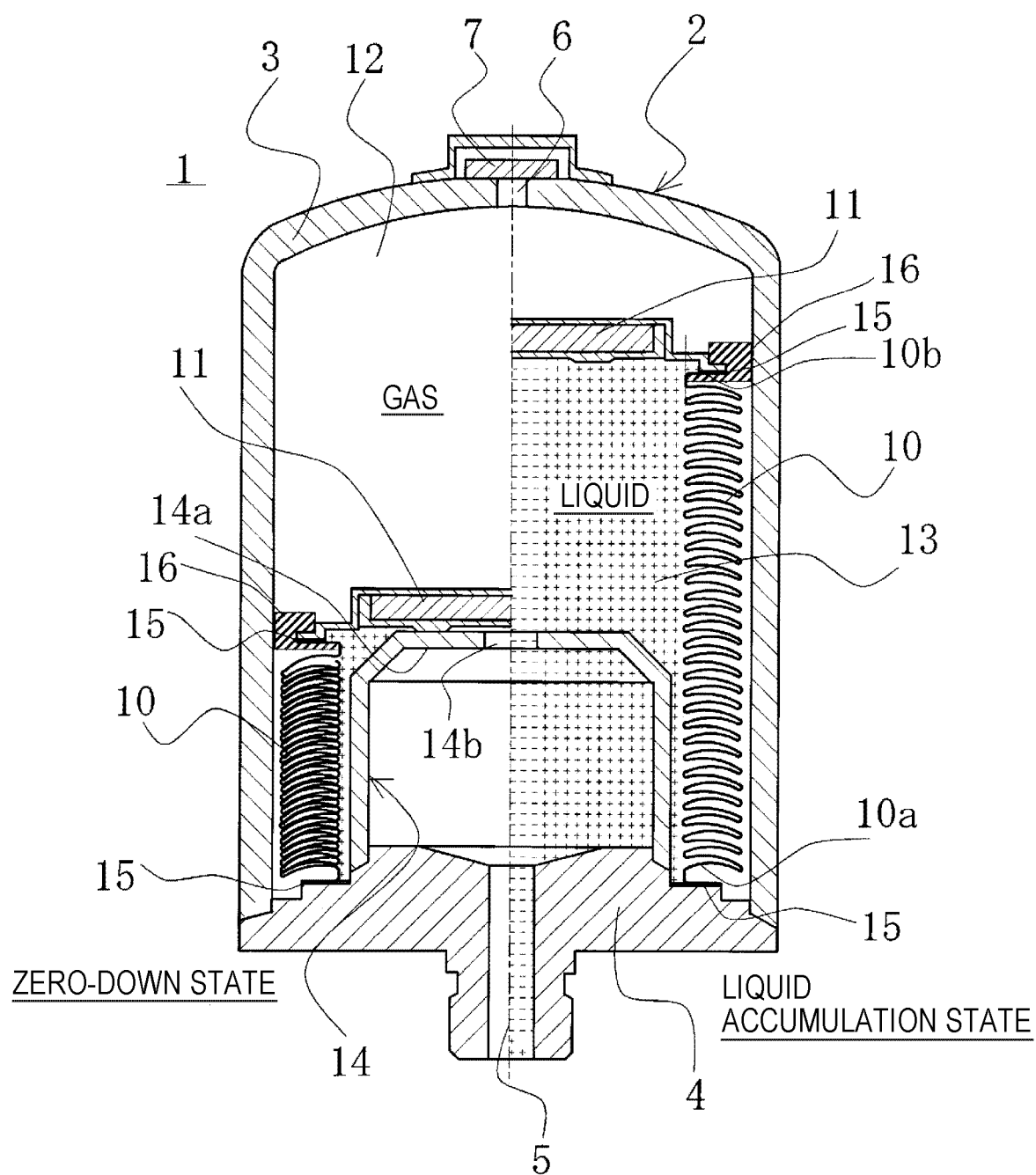
FIG. 1 is a vertical cross-sectional view of an accumulator with a metal bellows according to a first embodiment of the present invention.

FIG. 1 shows a cross section of an accumulator 1 with a metal bellows 10 according to a first embodiment of the present invention. The left side of the figure shows a contracted state of the metal bellows 10, and the right side of the figure shows an extended state of the metal bellows 10.

The accumulator 1 shown in FIG. 1 is a metal bellows-type accumulator including the metal bellows 10 formed as a bellows, and is configured as below.

First, an accumulator housing 2 with an oil port 4 connected to pressure piping (not shown) is provided. The metal bellows 10 and a bellows cap 11 are disposed in the interior of the housing 2 to partition the interior space of the housing 2 into a gas chamber 12 in which high-pressure gas (e.g. nitrogen gas) is sealed, and a liquid chamber 13 communicating with a port hole 5 of the oil port 4. The housing 2 consists of a combination of a bottomed cylindrical shell 3 and the oil port 4 fixed (welded) to an opening of the shell 3. A gas inlet 6 for injecting gas into the gas chamber 12 is provided at a bottom portion of the shell 3, and is closed by a gas plug 7 after gas injection.

The metal bellows 10 is fixed (welded) at a fixed end 10$a$ thereof to an inner surface of the oil port 4, a port-side inner surface of the housing 2, via a fitting member such as a collar, and is fixed (welded) at a freely moving end 10$b$ thereof to the bellows cap 11 in a disk shape via a fitting member 15 such as a collar.

A vibration damping ring 16 is fitted across an outer peripheral edge of the bellows cap 11 and the freely moving end 10$b$ so as to prevent the radial vibration of the metal bellows 10 and guide the axial movement of the metal bellows 10 in the shell 3 during extension and contraction operations.

In FIG. 1, the accumulator 1 is shown as an external gas-type accumulator in which the gas chamber 12 is disposed on the outer peripheral side of the metal bellows and the liquid chamber 13 is disposed on the inner peripheral side of the metal bellows 10.

An annular or a tubular stay 14 is positioned at and fixed (welded) to a port-side inner surface of the housing 2, that is, an inner surface of the oil port 4. The bellows cap 11 abuts so as to freely come into contact with or separate from an end (top end in the figure) of the stay 14. An inward flange 14$a$ is provided at an inner peripheral surface of the stay 14. The inner periphery of the flange 14$a$ defines a communicating hole 14$b$.

Next, the metal bellows 10 will be described.

Figure 2:
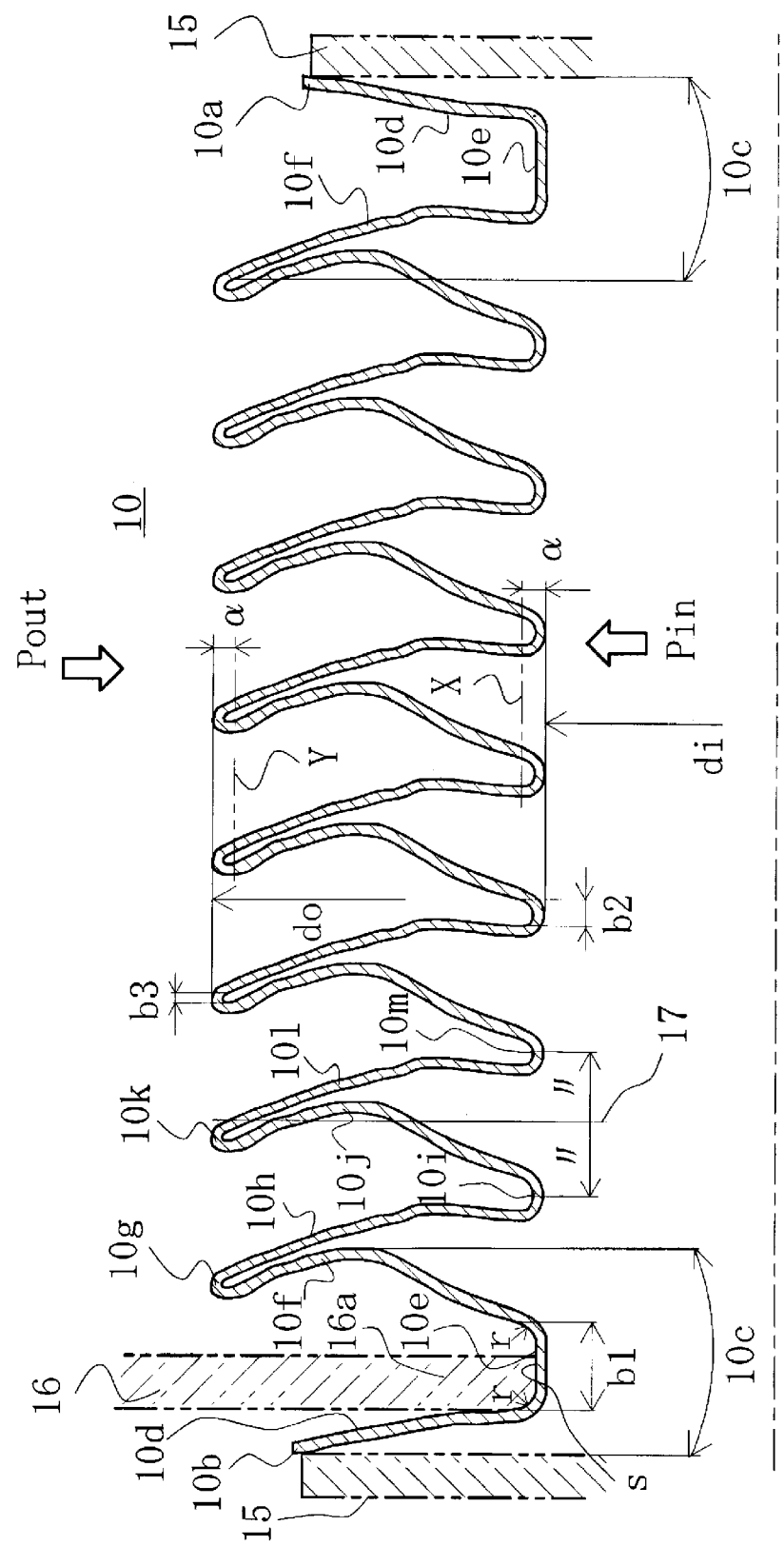
FIG. 2 is an axially half-cut cross-sectional view of a major part showing a free length state of the metal bellows neither extended nor contracted in an early stage of incorporation according to the first embodiment of the present invention.

FIG. 2 shows a free length state of the metal bellows 10 neither extended nor contracted in an early stage of incorporation. A dashed dotted line extending horizontally in a sheet lower portion shows the center of the metal bellows 10. The sheet left side is the side of the freely moving end 10$b$, and the right side is the side of the fixed end 10$a$.

In FIG. 2, the metal bellows 10 is a metal bellows annular-shaped and having, axially repeatedly, a structure in which, from an axial end portion, a belly, a valley, a belly, a peak, and a belly are integrally formed in series in this order.

Now, the side of the freely moving end 10$b$ of the metal bellows 10 will be described. An end portion 10$c$ has a first connection belly 10$d$ connected to the fitting member 15 such as a collar, and a connection valley 10$e$ and a second connection belly 10$f$ extending sequentially from the first connection belly 10$d$ toward the fixed end 10$a$ located at the other axial end.

Subsequent to the second connection belly 10$f$, a peak 10$g$, a belly 10$h$, a valley 10$i$, a belly 10$j$, a peak 10$k$, a belly 10$l$, a valley 10$m$, . . . continue sequentially toward the fixed end 10$a$.

In FIG. 2, the inner diameter di of valleys and the outer diameter do of peaks of the metal bellows 10 are each set the same.

In the free length state of the metal bellows 10 neither extended nor contacted in an early stage of incorporation, the valleys 10$i$, 10$m$, . . . each turn around in a U shape in cross section, and the peaks 10$g$, 10$k$, . . . each turn around in an arc shape in cross section.

Further, the peaks 10$g$, 10$k$, . . . are each formed between adjacent valleys on both sides of the peaks in such a manner that, for example, the peak 10$k$ is located in a position offset with respect to the center 17 of the pitch between the adjacent valleys 10$i$ and 10$m$ on both sides of the peak 10$k$ in a direction opposite to the side of arc-shaped protrusions of the bellies 10$j$ and 10$l$ (The left direction in FIG. 2. Hereinafter it is sometimes referred to as an "offset side.").

The metal bellows 10 of the present invention is characterized in that the axial width b1 of the connection valley 10$e$ of the end portion 10$c$ is set larger than the axial width b2 of the valleys 10$i$, 10$m$, . . . , or the axial width b3 of the peaks 10$g$, 10$k$, . . . in a portion other than the end portion 10$c$.

For example, the axial width b1 of the connection valley 10$e$ is set in the range of one-and-a-half to five times the axial width b2 of the valleys 10$i$, 10$m$, . . . or the axial width b3 of the peaks 10$g$, 10$k$, . . . .

The axial width of valleys (including connection valleys) or peaks in the present invention means an axial width at a radial position connecting connections at each valley between the valley and bellies on both sides thereof, or connections at each peak between the peak and bellies on both sides thereof. However, in some cases, the positions of connections between a valley or a peak and bellies on both sides thereof cannot be determined uniformly. Thus, for the sake of convenience, an axial width at a position X outwardly distant from the lowest point of the connection valley 10$e$ and the valleys 10$i$, 10$m$, . . . by a certain distance $\alpha$, or a position Y inwardly distant from the highest point of the peaks 10$g$, 10$k$, . . . by a certain distance $\alpha$ may be used as their axial width.

The connection valley 10$e$ of the end portion 10$c$ has a linear portion s at which an axial central portion of the connection valley 10$e$ is parallel to the axial direction. Opposite sides of the linear portion s are smoothly connected to the first connection belly 10$d$ and the second connection belly 10$f$ via respective arc-shaped r and r.

The proportion of the linear portion s to the axial width b1 of the connection valley 10$e$ is determined in design, and is preferably in the range of s/b1=0.1 to 0.9, for example, and more preferably, in the range of s/b1=0.65 to 0.68.

Into the connection valley 10$e$ at the end portion 10$c$ on the side of the freely moving end 10$b$ of the metal bellows 10, a mounting portion 16$a$ of the vibration damping ring 16 is inserted so that it abuts a surface of the connection valley 10$e$. When the mounting portion 16$a$ of the vibration damping ring 16 is inserted to abut the surface of the connection valley 10$e$ in this manner, the vibration damping ring 16 can be mounted securely. Even when the vibration damping ring 16 receives an external force from the side of the shell 3 while guiding the axial movement of the metal bellows 10 in the shell 3 during extension and contraction operations, disengagement or the like of the vibration damping ring 16 can be prevented.

In FIG. 2, an end portion 10$c$ on the side of the fixed end 10$a$ is formed in the same manner as the end portion 10$c$ on the side of the freely moving end 10$b$. The present invention is not limited to this, and may have only the end portion 10$c$ on one side.

In the present invention, the metal bellows 10 is not limited to an offset type as shown in FIG. 2, and, needless to say, can be applied to a different type of metal bellows such as a U-shaped bellows with peaks and valleys shaped like a letter U as in Conventional Art 1, or a bellows with peaks of a U-shaped cross-sectional shape protruding outward of the tube, and valleys of a V-shaped cross-sectional shape protruding inward of the tube as in Conventional Art 2.

Now, assume that pressure Pin acts on the inner diameter side of the metal bellows 10, and pressure Pout acts on the outer diameter side thereof.

Figure 3:
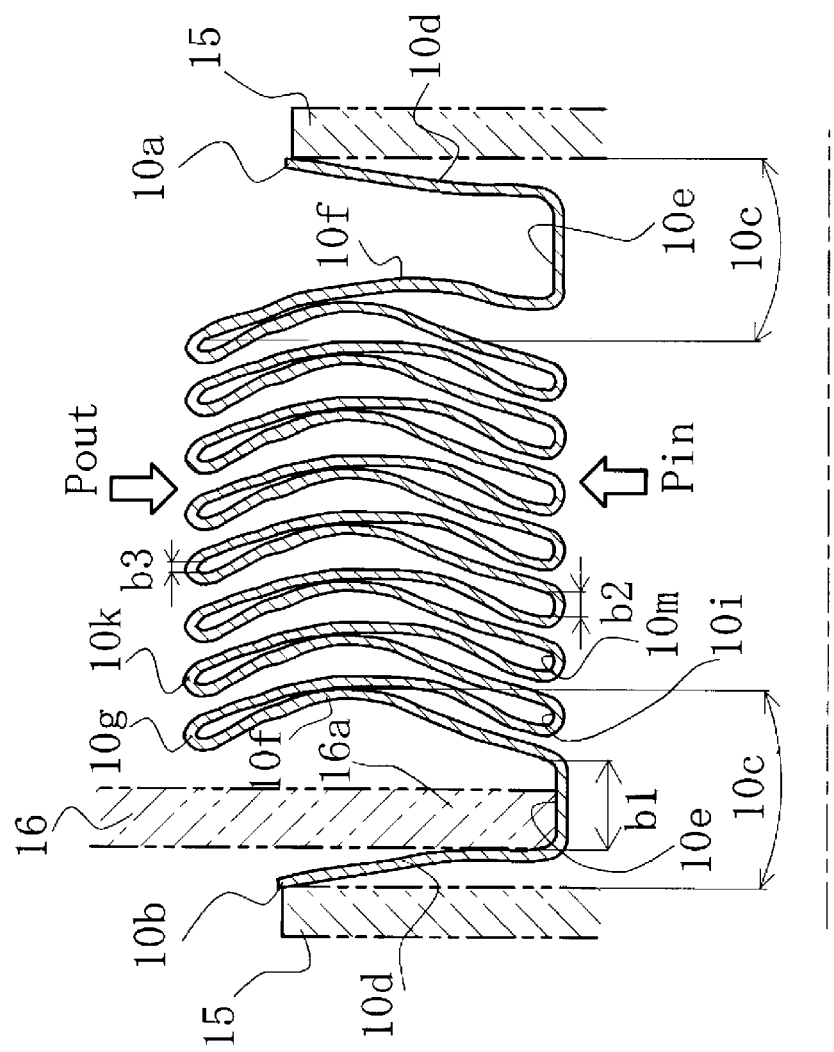
FIG. 3 is an axially half-cut cross-sectional view of the major part showing a contact length state of the metal bellows according to the first embodiment of the present invention.

When Pout>Pin, the bellies 10$f$, 10$h$, 10$j$, 10$l$, . . . are axially pressed into an axially compressed state as shown in FIG. 3. At this time, at the end portion 10$c$ on the side of the fixed end 10a and the end portion 10c on the side of the freely moving end 10b, the amount of deformation of the end portions 10c is small since the axial width b1 of the connection valleys 10e is set larger than the axial width b2 of the valleys 10i, 10m, . . . or the axial width b3 of the peaks 10g, 10k, . . . . Specifically, while the valleys 10i, 10m, . . . , which are U-shaped in cross section and have the smaller axial width b2, and the peaks 10g, 10k, . . . , which are arc-shaped in cross section and have the smaller axial width b3, are thus prone to axial extension and contraction deformation, the connection valleys 10e, which have the linear portions s and the larger axial width b1, are thus resistant to axial extension and contraction deformation. The amount of deformation of the connection valleys 10e, and hence, the amount of deformation of the end portions 10c decrease.

When the amount of deformation of the end portions 10c decreases, bending stress occurring at the end portions 10c decreases. Stress-caused breakage of the end portions 10c where stress is relatively concentrated can be prevented, and the life of the metal bellows 10 can be extended.

When the mounting portion 16a of the vibration damping ring 16 is inserted into the connection valley 10e at the end portion 10c on the side of the freely moving end 10b of the metal bellows 10 so that it abuts the surface of the connection valley 10e, the mounting of the vibration damping ring 16 becomes secure. Even when the vibration damping ring 16 is brought into contact with the shell 3, receiving an external force while axially moving of the metal bellows 10 in the shell 3 during extension and contraction operations, disengagement or the like of the vibration damping ring 16 can be prevented.

Further, even when the metal bellows 10 contracts as shown in FIG. 3, the connection valley 10e, which has the linear portion s and the larger axial width b1, thus prevents the first connection belly 10d and the second connection belly 10f from striking the mounting portion 16a of the vibration damping ring 16. Thus breakage of the first connection belly 10d and the second connection belly 10f can be prevented, and the life of the metal bellows 10 can be extended.

In the above-described first embodiment, the metal bellows 10 annular-shaped and having, axially repeatedly, a structure in which, from the axial end portion 10c, a belly, a valley, and a belly are integrally formed in series in this order, in which the end portion 10c has the first connection belly 10d connected to the fitting member 15, and the connection valley 10e and the second connection belly 10f extending sequentially from the first connection belly 10d axially inward, the axial central portion of the connection valley 10e has the linear portion s parallel to the axial direction, and the axial width b1 of the connection valley 10e in a free state is set larger than the axial width of the valleys 10i, 10m, . . . or the peaks 10g, 10k, . . . in a portion other than the end portion 10c, thus achieves the following effects.

(1) The amount of deformation of the connection valley 10e at the end portion 10c of the metal bellows 10, and hence, the amount of deformation of the end portion 10c can be reduced. Bending stress occurring at the end portion 10c can be reduced. Stress-caused breakage of the end portion 10c where stress is relatively concentrated can be prevented. Thus the life of the metal bellows 10 can be extended.

(2) A lateral space for fitting the vibration damping ring 16 to the connection valley 10e at the end portion 10c of the metal bellows 10 can be provided, which allows secure mounting of the vibration damping ring 16, and prevents the first connection belly 10d and the second connection belly 10f from striking the mounting portion 16a of the vibration damping ring 16 even when the metal bellows 10 contracts. Thus breakage of the first connection belly 10d and the second connection belly 10f can be prevented, and the life of the metal bellows 10 can be extended.

(3) Further, the connection valley 10e includes the linear portion s parallel to the axial direction, so that the axial width of the connection valley 10e in the free state can be easily increased.

(4) Further, the vibration damping ring 16 for guiding the axial movement of the metal bellows 10 in the shell 3 during extension and contraction operations is provided in the connection valley 10e at the end portion 10c on the side of the freely moving end 10b of the metal bellows 10, so that the vibration damping ring 16 can be mounted securely. Thus the vibration damping ring 16 can sufficiently exert a guiding function.

Second Embodiment

Figure 4:
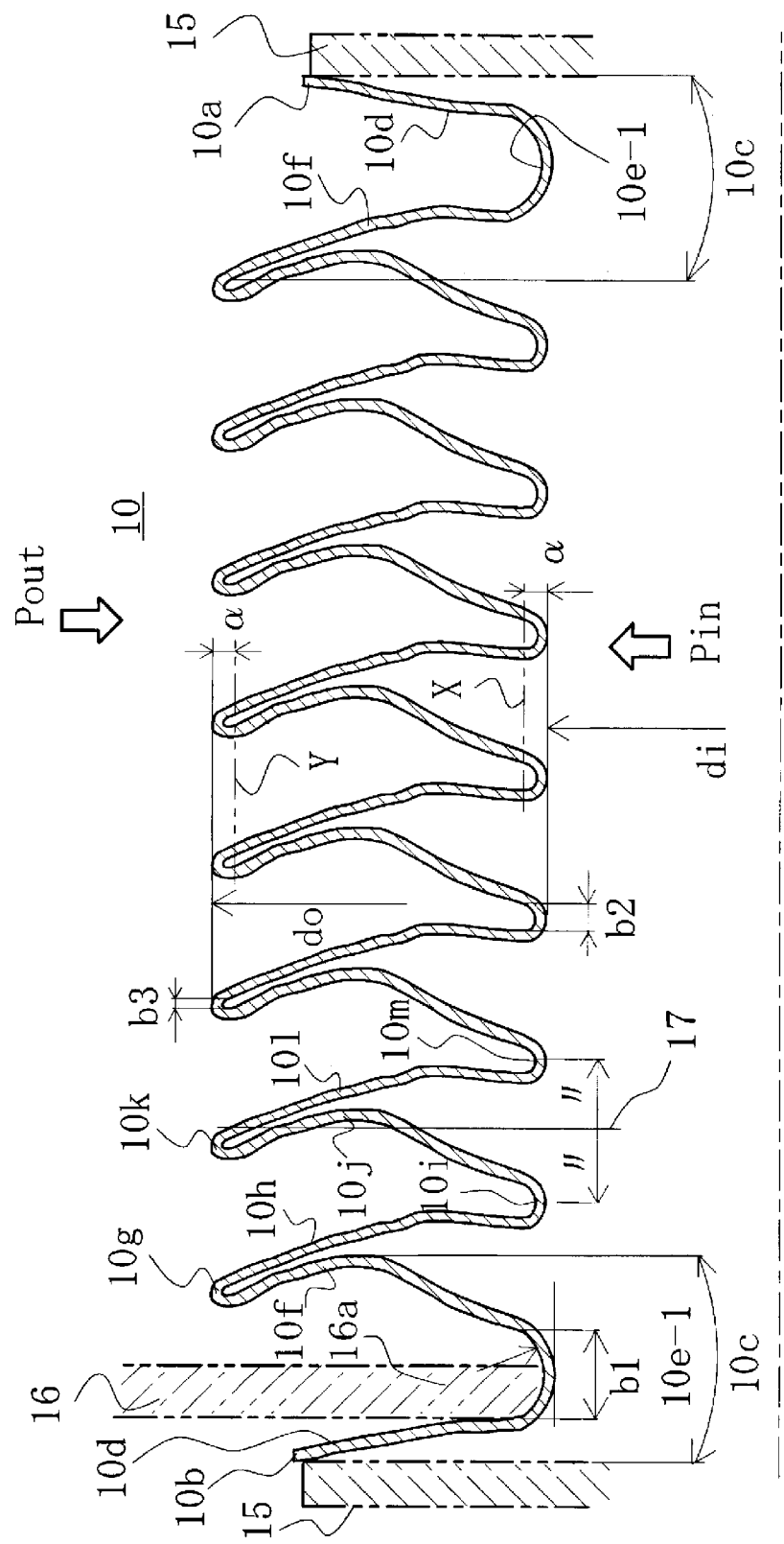
FIG. 4 is an axially half-cut cross-sectional view of a major part showing a free length state of a metal bellows neither extended nor contracted in an early stage of incorporation according to a second embodiment of the present invention.

With reference to FIG. 4, a metal bellows 10 according to a second embodiment of the present invention will be described.

The metal bellows 10 according to the second embodiment is different from that in the first embodiment in the shape of a connection valley. Other basic configuration is identical to that in the first embodiment, and the same members are given the same reference numerals and letters, and redundant descriptions will be omitted.

In FIG. 4, the side of a freely moving end 10b of the metal bellows 10 will be described. An end portion 10c has a first connection belly 10d connected to a fitting member 15 such as a collar, and a connection valley 10e-1 and a second connection belly 10f extending sequentially from the first connection belly 10d toward the side of a fixed end 10a located at the other axial end.

As in the first embodiment, subsequent to the second connection belly 10f, a peak 10g, a belly 10h, a valley 10i, a belly 10j, a peak 10k, a belly 10l, a valley 10m, continue sequentially toward the fixed end 10a.

In FIG. 4, as in the first embodiment, the inner diameter di of valleys and the outer diameter do of peaks of the metal bellows 10 are each set the same.

The metal bellows 10 of the present invention is characterized in that the axial width b1 of the connection valley 10e-1 of the end portion 10c is set larger than the axial width b2 of the valleys 10i, 10m, . . . , or the axial width b3 of the peaks 10g, 10k, . . . in a portion other than the end portion 10c.

For example, the axial width b1 of the connection valley 10e-1 is set in the range of one-and-a-half to five times the axial width b2 of the valleys 10i, 10m, . . . or the axial width b3 of the peaks 10g, 10k, . . . .

The connection valley 10e-1 of the end portion 10c is formed by an arc portion having a curvature radius R larger than that of the arc of the valleys 10i, 10m, . . . or the peaks 10g, 10k, . . . other than the end portion 10c.

A mounting portion 16a of a vibration damping ring 16 is inserted into the connection valley 10e-1 at the end portion 10c on the side of the freely moving end 10b of the metal bellows 10 so that it abuts a surface of the connection valley 10e-1. When the mounting portion 16a of the vibration damping ring 16 is inserted to abut the surface of the connection valley 10e-1 in this manner, the vibration damping ring 16 can be mounted securely. Even when the vibration damping ring 16 receives an external force from the side of the shell 3 while guiding the axial movement of the metal bellows 10 in a shell 3 during extension and contraction operations, disengagement or the like of the vibration damping ring 16 can be prevented.

In FIG. 4, an end portion 10c on the side of the fixed end 10a is formed in the same manner as the end portion 10c on the side of the freely moving end 10b. The present invention is not limited to this, and may have only the end portion 10c on one side.

Now, assume that pressure Pin acts on the inner diameter side of the metal bellows 10, and pressure Pout acts on the outer diameter side thereof.

When Pout>Pin, the bellies 10f, 10h, 10j, 10l, . . . are axially pressed into an axially compressed state. At this time, at the end portion 10c on the side of the fixed end 10a and the end portion 10c on the side of the freely moving end 10b, the amount of deformation of the end portions 10c is small since the axial width b1 of the connection valleys 10e-1 is set larger than the axial width b2 of the valleys 10i, 10m, . . . or the axial width b3 of the peaks 10g, 10k, . . . . Specifically, while the valleys 10i, 10m, . . . , which are U-shaped in cross section and have the smaller axial width b, and the peaks 10g, 10k, . . . , which are arc-shaped in cross section and have the smaller axial width b3, are thus prone to axial extension and contraction deformation, the connection valleys 10e-1, which are formed by the arc portions with the larger curvature radius R and have the larger axial width b1, are thus resistant to axial extension and contraction deformation. The amount of deformation of the connection valleys 10e-1, and hence, the amount of deformation of the end portions 10c decrease.

When the amount of deformation of the end portions 10c decreases, bending stress occurring at the end portions 10c decreases. Stress-caused breakage of the end portions 10c where stress is relatively concentrated can be prevented, and the life of the metal bellows 10 can be extended.

When the mounting portion 16a of the vibration damping ring 16 is inserted into the connection valley 10e-1 at the end portion 10c on the side of the freely moving end 10b of the metal bellows 10 so that it abuts the surface of the connection valley 10e-1, the mounting of the vibration damping ring 16 becomes secure. Even when the vibration damping ring 16 is brought into contact with the shell 3, receiving an external force while axially moving of the metal bellows 10 in the shell 3 during extension and contraction operations, disengagement or the like of the vibration damping ring 16 can be prevented.

Further, even when the metal bellows 10 contracts, the connection valley 10e-1, which is formed by the arc portion with the larger curvature radius R and has the larger axial width b1, thus prevents the first connection belly 10d and the second connection belly 10f from striking the mounting portion 16a of the vibration damping ring 16. Thus breakage of the first connection belly 10d and the second connection belly 10f can be prevented, and the life of the metal bellows 10 can be extended.

In the above-described second embodiment, the metal bellows 10 annular-shaped and having, axially repeatedly, a structure in which, from the axial end portion 10c, a belly, a valley, a belly, a peak, and a belly are integrally formed in series in this order, in which the end portion 10c has the first connection belly 10d connected to the fitting member 15, and the connection valley 10e-1 and the second connection belly 10f extending sequentially from the first connection belly 10d axially inward, the connection valley 10e-1 is formed by the arc portion with the larger curvature radius R, and the axial width b1 of the connection valley 10e-1 in a free state is set larger than the axial width of the valleys 10i, 10m, . . . or the peaks 10g, 10k, . . . in a portion other than the end portion 10c, thus achieves the following effects.

(1) The amount of deformation of the connection valley 10e-1 at the end portion 10c of the metal bellows 10, and hence, the amount of deformation of the end portion 10c can be reduced. Bending stress occurring at the end portion 10c can be reduced. Stress-caused breakage of the end portion 10c where stress is relatively concentrated can be prevented. Thus the life of the metal bellows 10 can be extended.

(2) A lateral space for fitting the vibration damping ring 16 to the connection valley 10e-1 at the end portion 10c of the metal bellows 10 can be provided, which allows secure mounting of the vibration damping ring 16, and prevents the first connection belly 10d and the second connection belly 10f from striking the mounting portion 16a of the vibration damping ring 16 even when the metal bellows 10 contracts. Thus breakage of the first connection belly 10d and the second connection belly 10f can be prevented, and the life of the metal bellows 10 can be extended.

(3) Further, the connection valley 10e-1 is formed by the arc portion with the curvature radius larger than the curvature radius of the valleys 10i, 10m, . . . or the peaks 10g, 10h, . . . in a portion other than the end portion 10c, so that the connection valley 10e-1 can be entirely formed by a smooth curve when the axial width of the connection valley 10e-1 in the free state is increased, and stress concentration at the connection valley 10e-1 can be prevented.

(4) Further, the vibration damping ring 16 for guiding the axial movement of the metal bellows 10 in the shell 3 during extension and contraction operations is provided in the connection valley 10e-1 at the end portion 10c on the side of the freely moving end 10b of the metal bellows 10, so that the vibration damping ring 16 can be mounted securely. Thus the vibration damping ring 16 can sufficiently exert a guiding function.

Third Embodiment

Figure 5:
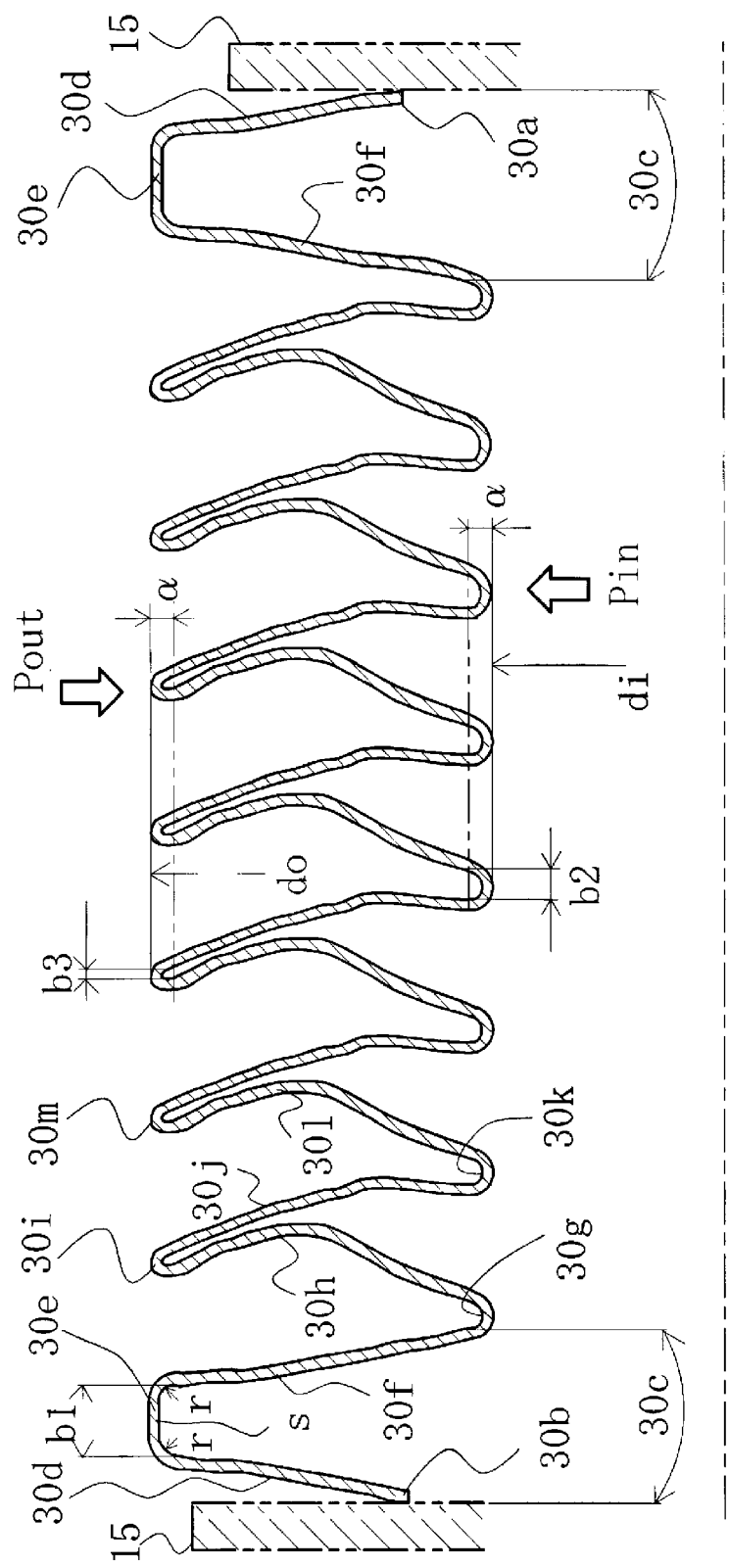
FIG. 5 is an axially half-cut cross-sectional view of a major part showing a free length state of a metal bellows neither extended nor contracted in an early stage of incorporation according to a third embodiment of the present invention.

With reference to FIG. 5, a metal bellows 30 according to a third embodiment of the present invention will be described.

The metal bellows 30 according to the third embodiment is different from that in the first embodiment in the shape of an end portion. Other basic configuration is identical to that in the first embodiment, and redundant descriptions will be omitted.

In FIG. 5, the side of a freely moving end 30b of the metal bellows 30 will be described. An end portion 30c has a first connection belly 30d connected to a fitting member 15 such as a collar, and a connection peak 30e and a second connection belly 30f extending sequentially from the first connection belly 30d toward the side of a fixed end 30a located at the other axial end.

As in the first embodiment, subsequent to the second connection belly 30f, a valley 30g, a belly 30h, a peak 30i, a belly 30j, a valley 30k, a belly 30l, a peak 30m, continue sequentially toward the fixed end 30a.

In FIG. 5, as in the first embodiment, the inner diameter di of valleys and the outer diameter do of peaks of the metal bellows 30 are each set the same.

The metal bellows 30 of the present invention is characterized in that the axial width b1 of the connection peak 30e of the end portion 30c is set larger than the axial width b2 of the valleys 30g, 30k, . . . or the axial width b3 of the peaks 30i, 30m, . . . in a portion other than the end portion 30c.

For example, the axial width b1 of the connection peak 30e is set in the range of one-and-a-half to five times the axial width b2 of the valleys 30g, 30k, . . . or the axial width b3 of the peaks 30i, 30m, . . . .

The connection peak 30e of the end portion 30c has a linear portion s at which an axial central portion of the connection peak 30e is parallel to the axial direction. Opposite sides of the linear portion s are smoothly connected to the first connection belly 30d and the second connection belly 30f via respective arc-shaped r and r.

The proportion of the linear portion s to the axial width b1 of the connection peak 30e is determined in design, and is preferably in the range of s/b1=0.1 to 0.9, for example, and more preferably, in the range of s/b1=0.65 to 0.68.

Now, assume that pressure Pin acts on the inner diameter side of the metal bellows 30, and pressure Pout acts on the outer diameter side thereof.

When Pout>Pin, the bellies 30h, 30j, 30l, . . . are axially pressed into an axially compressed state. At this time, at the end portion 30c on the fixed end 30a side and the end portion 30c on the freely moving end 30b side, the amount of deformation of the end portions 30c is small since the axial width b1 of the connection peaks 30e is set larger than the axial width b2 of the valleys 30g, 30k, . . . , or the axial width b3 of the peaks 30i, 30m, Specifically, while the valleys 30g, 30k, . . . , which are U-shaped in cross section and have the smaller axial width b, and the peaks 30i, 30m, . . . , which are arc-shaped in cross section and have the smaller axial width b3, are thus prone to axial extension and contraction deformation, the connection peaks 30e, which have the linear portions s and the larger axial width b1, are thus resistant to axial extension and contraction deformation. The amount of deformation of the connection peaks 30e, and hence, the amount of deformation of the end portions 30c decrease.

When the amount of deformation of the end portions 30c decreases, bending stress occurring at the end portions 30c decreases. Stress-caused breakage of the end portions 30c where stress is relatively concentrated can be prevented, and the life of the metal bellows 30 can be extended.

In the above-described third embodiment, the metal bellows 30 annular-shaped and having, axially repeatedly, a structure in which, from the axial end portion 30c, a belly, a peak, a belly, a valley, and a belly are integrally formed in series in this order, in which the end portion 30c has the first connection belly 30d connected to the fitting member 15, and the connection peak 30e and the second connection belly 30f extending sequentially from the first connection belly 30d axially inward, the axial central portion of the connection peak 30e has the linear portion s parallel to the axial direction, and the axial width of the connection peak 30e in a free state is set larger than the axial width of the peaks 30i, 30m, . . . or the valleys 30g, 30k, . . . in a portion other than the end portion 30c, thus achieves the following effects.

(1) The amount of deformation of the connection peak 30e at the end portion 30c of the metal bellows 30, and hence, the amount of deformation of the end portion 30c can be reduced. Bending stress occurring at the end portion 30c can be reduced. Stress-caused breakage of the end portion 30c where stress is relatively concentrated can be prevented. Thus the life of the metal bellows 30 can be extended.

(2) Further, the connection peaks 30e includes the linear portion s parallel to the axial direction, so that the axial width of the connection peaks 30e in the free state can be easily increased.

Although the embodiments of the present invention have been described above with reference to the drawings, specific configuration is not limited to the embodiments. Any changes and additions made without departing from the scope of the present invention are included in the present invention.

For example, the above embodiments have described the case where the metal bellows 10 and 30 according to the present invention are fitted in an accumulator, but are not limited to this, and can be used in other industrial fields including pipe lines.

Further, for example, the above embodiments have described the case where the metal bellows 10 and 30 are offset type, but the present invention is not limited to this, and can be applied to a different type of metal bellows such as a U-shaped bellows with peaks and valleys shaped like a letter U as in Conventional Art 1, or a bellows with peaks of a U-shaped cross-sectional shape protruding outward of the tube, and valleys of a V-shaped cross-sectional shape protruding inward of the tube as in Conventional Art 2.

REFERENCE SIGN LIST 1 accumulator
2 housing
3 shell
4 oil port
5 port hole
6 gas inlet
7 gas plug
10, 30 metal bellows
10a, 30a fixed end
10b, 30b freely moving end
10c, 30c end portion
10d, 30d first connection belly
10f, 30f second connection belly
10e, 10e-1 connection valley
30e connection peak
10g, 10k, 30i, 30m peak
10i, 10m, 30g, 30k valley
10h, 10i, 10l, 30h, 30j, 30l belly
11 bellows cap
12 gas chamber
13 liquid chamber
14 stay
15 fitting member (collar)
16 vibration damping ring
17 center of pitch of valleys
di inner diameter of valley
do outer diameter of peak
X position distant outward from lowest point of valley by certain distance α
Y position distant inward from highest point of peak by certain distance α
s connection valley linear portion
Pin pressure on inner diameter side
Pout pressure on outer diameter side

The invention claimed is:

1. A metal bellows in an annular shape configured to be accommodated in a shell, having a fixed end and an freely moving end in an axial direction, and comprising, axially repeatedly, a structure in which, from an axial end portion at each of the fixed end and the freely moving end, a belly, a valley, a belly, a peak, and a belly are integrally formed in series sequentially in this order, wherein
    the end portion has a first connection belly connected to a fitting member, and a connection valley and a second connection belly extending sequentially from the first connection belly axially inward, and
    the connection valley in a free state has an axial width set larger than an axial width of valleys or peaks in a portion other than the end portion,
    wherein the metal bellows further comprises a vibration damping ring for guiding the metal bellows to axially move along an inner surface of the shell during extension and contraction operations, provided at the freely moving end in a manner fitting astride the fitting member and the freely moving end, wherein the vibration damping ring includes a mounting portion inserted in the end portion at the freely moving end in a manner abutting against and contacting a surface of the connection valley of the end portion.

2. The metal bellows according to claim 1, wherein the connection valley includes a linear portion parallel to an axial direction.

3. The metal bellows according to claim 1, wherein the connection valley is formed by an arc portion with a curvature radius larger than a curvature radius of valleys or peaks in a portion other than the end portion.

* * * * *